Patented Sept. 9, 1941

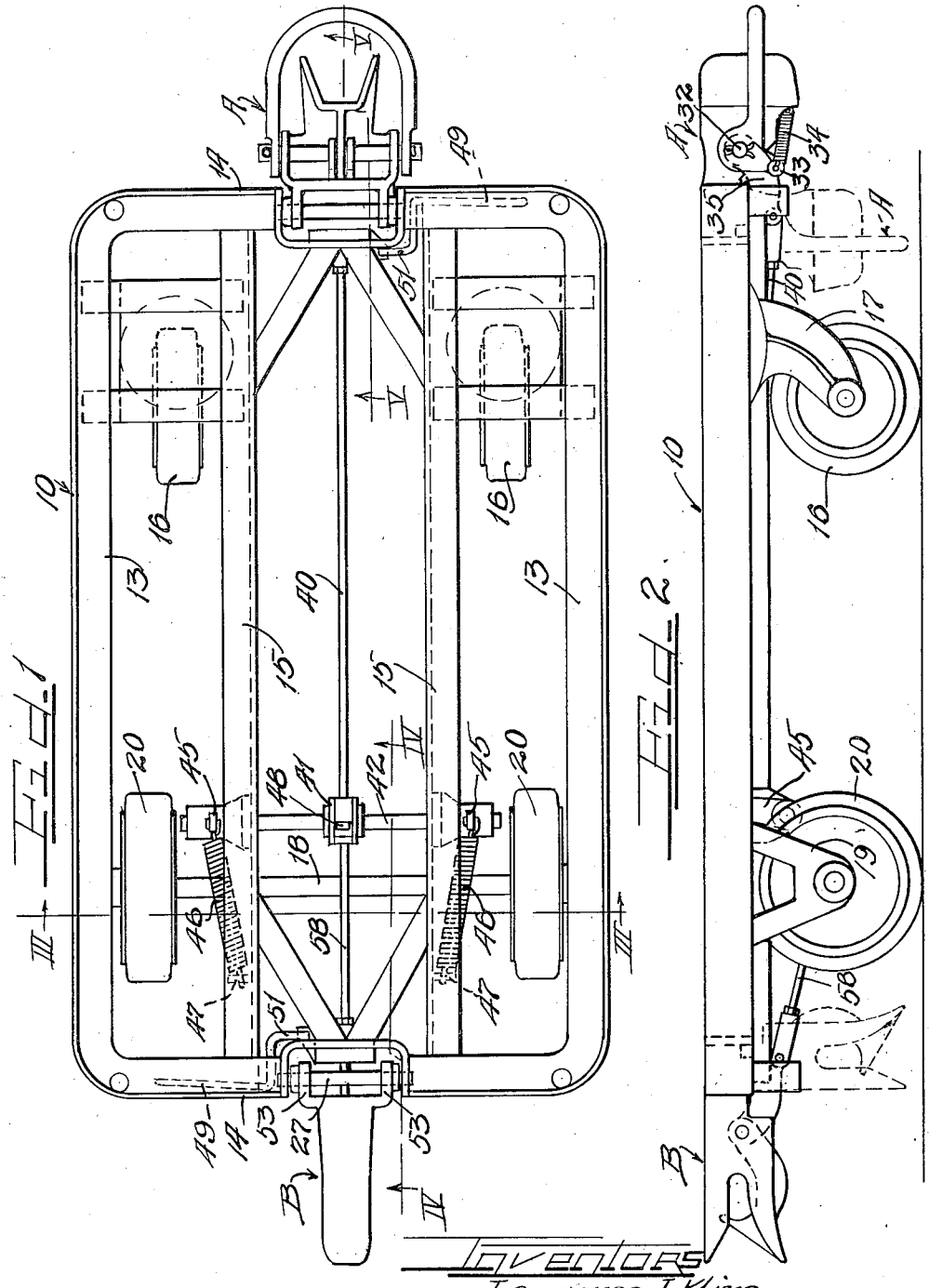

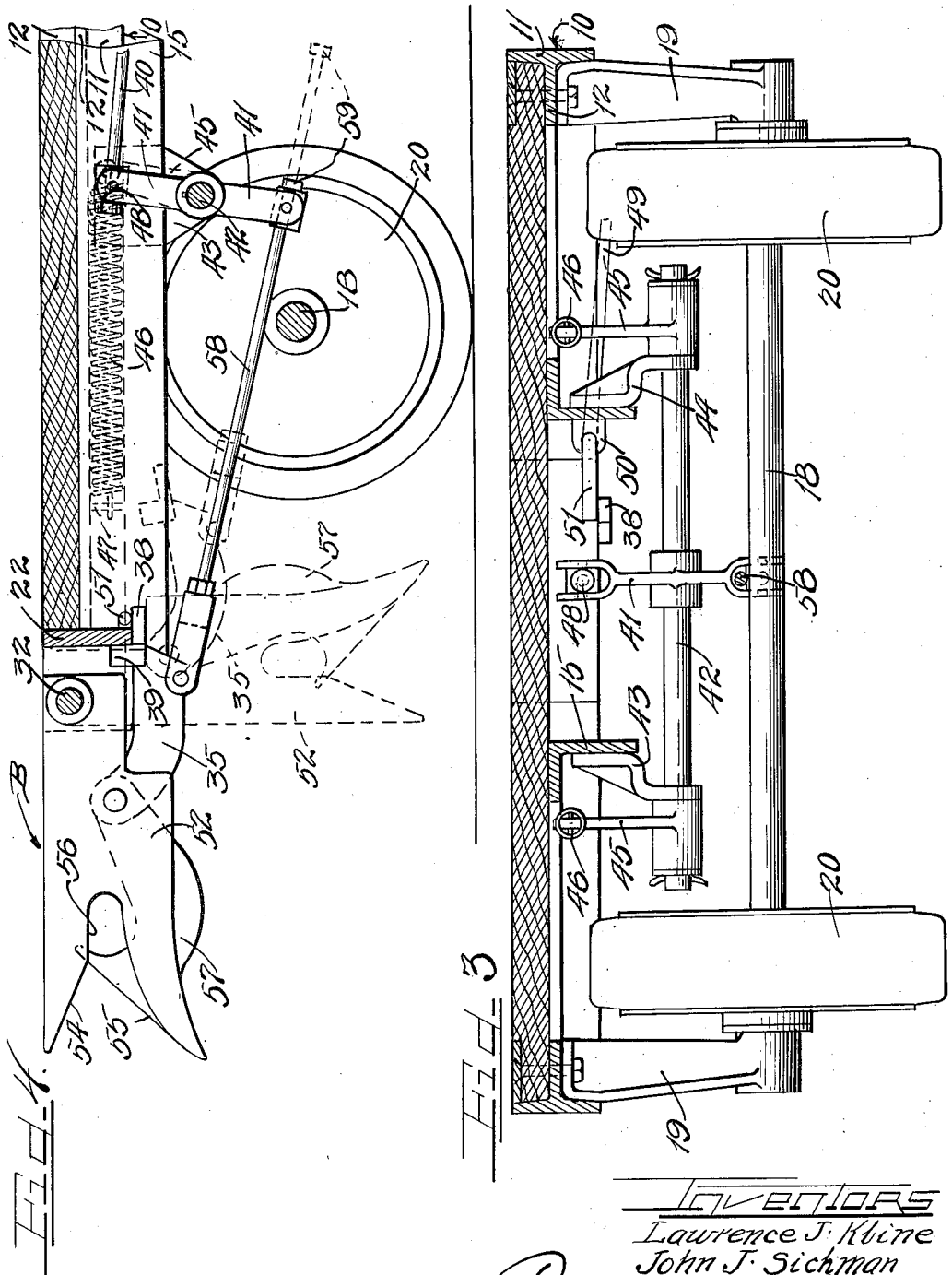

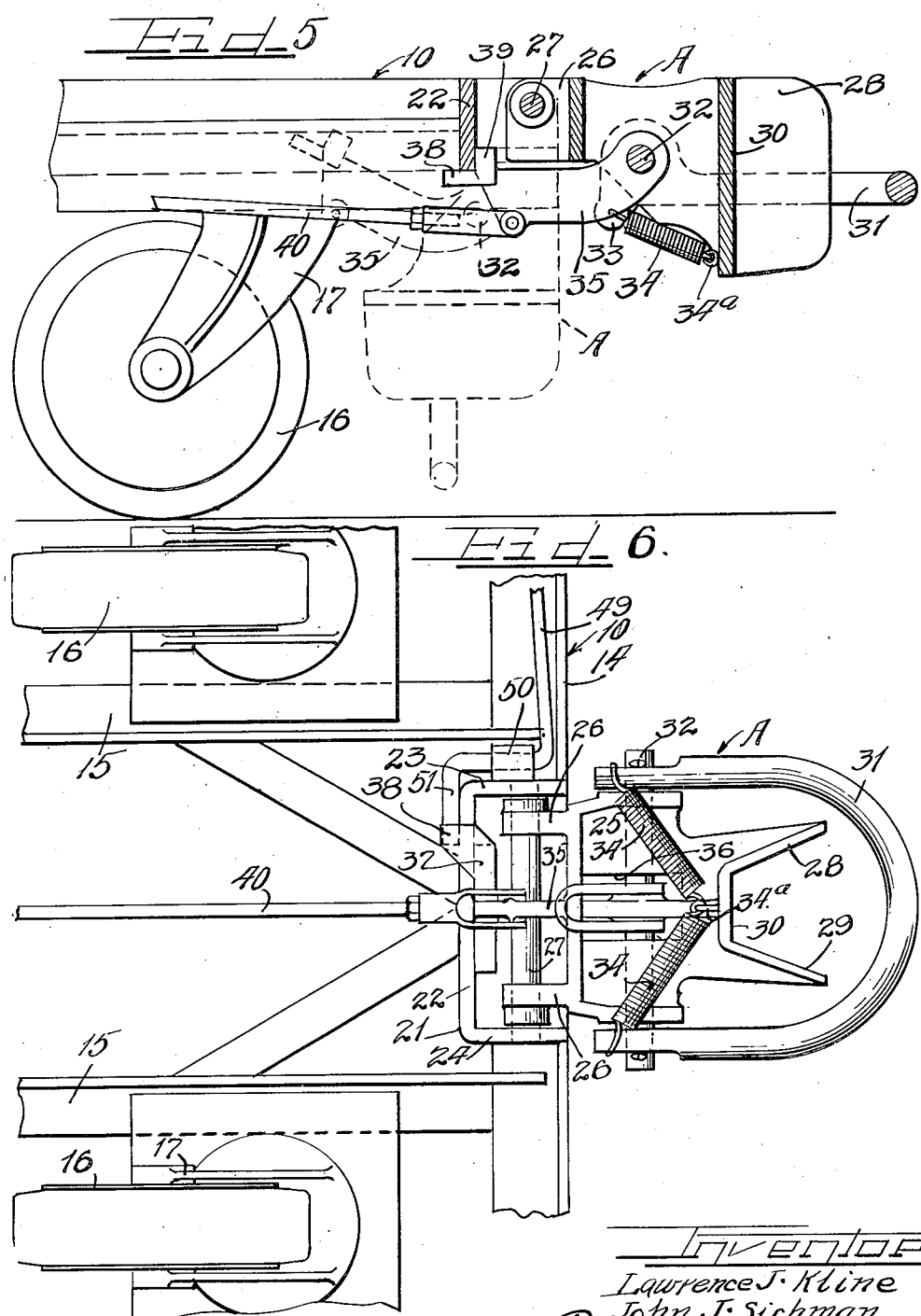

2,255,525

UNITED STATES PATENT OFFICE 2,255,525

VEHICLE COUPLING

Lawrence J. Kline, La Grange, and John J. Sichman, Chicago Heights, Ill., assignors to The Mercury Manufacturing Company, Chicago, Ill., a corporation of Illinois Application January 25, 1939, Serial No. 252,755

15 Claims. (Cl. 280—33.15)

The present invention relates in general to a vehicle coupling and is more particularly concerned with improved couplings such as applied to trailers and trucks of the type utilized for moving freight and merchandise in warehouses, freight depots and the like. Such trucks are also used for transporting freight and merchandise which is loaded onto the trucks at a point of origin and the loaded trucks are then loaded into freight cars or onto ships, conveyed to destinations, and unloaded at the destination, without any of the freight or merchandise being being removed from the trucks at any time.

In connection with the use of trucks of this type, it is highly desirable that coupling means be provided which may be utilized in the usual manner for the coupling of the trucks into a train, but which may be collapsed or swung out of the way when the trucks are loaded into cars or aboard ship. Thus, the trucks may be positioned in the car with their ends in abutting relation without interference from the associated couplings.

The present invention therefore contemplates as a primary object, the provision of a novel collapsible coupling for vehicles.

It is a further object of the invention to provide couplers for trucks, which may be swung out of the way when not in use to allow grouping of the trucks in compact formation for reducing waste floor space.

Another object of the invention is to provide vehicle coupling means which may be latched in a position projecting from the end of the vehicle, but which may be released, when desired, the coupling means when released being automatically movable to a collapsed position rearwardly disposed of the adjacent extreme end portion of the vehicle upon which it is mounted.

A still further object is to provide an improved arrangement of coupling elements at the opposite ends of a vehicle such as a truck, which may be selectively latched and unlatched for movements to operative and non-operative positions, and wherein the respective latches have common means for actuating them to latched positions.

In accordance with the general features of the present invention, it is proposed to provide complementary coupling bars at the opposite ends of the truck or other vehicle and pivotally support the coupling bars at one end for swinging movement into extended operative position projecting forwardly of the truck end, and to depending position extending below the end of the vehicle and disposed to the rear thereof so that the vehicle may be positioned with this end against a wall surface or in abutment with the end of a similar vehicle. The drawbars may therefore be collapsed so that they will not interfere with the grouping of the vehicles in compact formation for reducing waste floor space. It will be noted that with this arrangement, the drawbars normally tend to automatically move from extended to depending position under the action of gravity.

For securing the drawbars in operative extended position, novel latching means are provided. Each drawbar is provided with a latch which is arranged to automatically move into latching position when the drawbar is moved from its depending to its extended normal position. Means are provided for respectively tripping the drawbar latches so that either or both of the drawbars may be released for movement to depending position, when desired.

As an added feature of the invention it is proposed to actuate the latches of the drawbars from a common spring which is connected through suitable links, this spring being effective to operate the latch of either drawbar irrespective of the position of the other drawbar.

The above, other and further objects of the invention will be apparent from the following description, accompanying drawings, and appended claims.

Various aspects of the present invention are illustrated in the accompanying drawings, and the views thereof are as follows:

Figure 1 is a plan view of a truck equipped with coupling means embodying principles of the present invention.

Figure 2 is a side elevational view of the truck showing the coupler in full lines in normal operative position, and in dotted lines the position of the coupler when swung to depending inoperative position.

Figure 3 is an enlarged transverse sectional view taken through the truck and showing details of certain parts of the latching mechanism for the couplers, taken substantially on line III—III of Figure 1.

Figure 4 is an enlarged fragmentary view, partly in section, showing details of the coupling mechanism at one end of the truck, taken substantially on line IV—IV of Figure 1.

Figure 5 is a similar view of the coupling mechanism at the opposite end of the truck, taken substantially on line V—V of Figure 1.

Figure 6 is an enlarged fragmentary bottom plan view of the coupler and associated truck end shown in Figure 5.

The drawings will now be explained.

As illustrated in the drawings, the truck to which the present invention is applied is shown as comprising a horizontal disposed frame structure 10 of substantially rectangular form. In the present instance, this frame is illustrated as having a vertical flange 11 and a horizontally extending flange 12 at substantially mid-height of the vertical flange. As formed, the frame 10 provides side members 13—13 and opposed end members 14—14. The framework is strengthened by means of longitudinally extending spaced apart angle irons 15 which connect the end members of the frame.

Adjacent one end of the truck body described above are pivoted caster wheels 16 carried in yokes 17 which are pivotally connected to the frame of the truck. These wheels are freely pivotal as is customary in trucks of this type.

At the other or rear end of the truck body, a shaft 18 is rotatably journaled in suitable bearing brackets 19—19, these bearing brackets being suitably supported in depending position from the truck frame. Rear wheels 20—20 are carried by the shaft 18.

The truck is provided at its opposite ends with complementary or mating couplers, each generally indicated at A and B respectively. It will be noted that the end frames 14—14 at the position of the couplers A and B are provided with an inwardly recessed section which is formed by a U-shaped frame piece 21 having an integrally formed bridging portion 22 and spaced legs 23 and 24 which may be welded or otherwise rigidly secured in the end frame.

As shown in detail in Figures 5 and 6, the coupler A at the forward end of the truck comprises a bumper head 25. The bumper head is provided at its rear end with spaced lugs 26—26 which are arranged to extend into the recess formed by the U-shaped member 21 of the associated end frame of the truck. These lugs are apertured to receive a pivot pin 27 which has its ends respectively supported in the legs 23 and 24 of the member 21. The member 25 is thus arranged for vertical swinging movement from a normal operative position extending from the end of the truck frame to a depending position extending below the associated end of the truck. It will be noted that since this member is pivoted in the recess portion of the frame, the coupler will be disposed rearwardly of the outermost extremity of the frame, when the coupler is in depending position.

The bumper head at its outermost or free end is provided with outwardly diverging wing surfaces 28 and 29 which are bridged at their innermost edges by a bridging surface 30, these surfaces cooperating to form a vertically disposed end groove in the bumper head.

A bail member 31 of U-shaped construction is pivotally supported at its ends on a transversely extending pivot pin 32. The bail extends around and forwardly of the groove in the free end of member 25. As shown in Figure 5, the ends of the bail are provided with angularly disposed lugs 33, these lugs being respectively connected to springs 34—34 having their other ends anchored at a common point 34a on the member 25. These springs operate to resiliently retain the bail 31 in substantially horizontal extended position, but enable swinging movement therefrom.

A latching bar 35 is provided, this bar having one end extending into an aperture 36 in the bar 25 and pivotally mounted for swinging movement on the pin 32. The latching bar extends rearwardly and below the pivot pin 27 and is provided at its unpivoted end with an abutment member 37 with a laterally extending ledge 38 for engaging with the lowermost edge of the bridging portion of member 21 to limit upward swinging of the latching bar 35, when the coupler is in normal operative position. The abutment member 37 is also provided with an upstanding portion 39 which is arranged to engage the inner marginal surface at this edge of the bridging portion 22, to prevent rearward shifting of the latching bar and the downward swinging movement of the coupler to depending position.

The latch 35 is connected through a link 40 which is pivoted at one end to the latch and at its other end to a rocker arm 41 supported on a shaft 42 for rotative movement therewith, this shaft being trunnioned adjacent its ends in spaced bearing brackets 43 and 44 supported in depending position from the frame angle members 15—15. The outermost ends of the shaft 42 carry lever arms 45 which are respectively connected at their outermost ends to tensioning springs 46—46, the other ends of these springs being respectively anchored to the frame structure as generally shown at 47. The link 40, where it is connected to the rocker arm 41 is arranged for sliding movement in one direction and provided with an end head 48 to prevent relative sliding movement in the opposite direction. The springs 46—46 act to rock the shaft 42 in a counter-clockwise direction as viewed in Figure 4 and apply a tensioning force against the latch member 35 which operates to move it in a clockwise direction, as shown in Figure 5, into latching position.

For releasing the latch 35, there is provided a lever 49 which extends to one side of the coupler. This lever is pivotally supported in a bearing 50 on the leg 23 of member 21, and is provided with a deflected end portion 51 adapted to normally overlie the ledge 38 so that when the lever 49 is pulled upwardly, its end 51 will act to depress the abutment member 37 and release the latch 35 for rearward movement.

As soon as this latch is released, the coupler swings to depending position under the action of gravity and the latch member 35 assumes a position as shown in dotted lines in Figure 5. This action shifts the connecting link 40 in a longitudinal direction so that it is not now acted upon by the springs 46—46. When it is desired to place the coupling in operative extended position, it is only necessary to manually swing it into extended position, whereupon the member 35 automatically latches the coupler against movement in the opposite direction to depending position.

The complementary coupler B comprises in general a drawbar 52 having spaced lugs 53—53 at its innermost end which are pivoted on a pin 27 in the same manner as the coupler A.

The drawbar 52 at its outermost end is provided with outwardly diverging guiding surfaces 54 and 55 in vertically disposed relation which communicate at their inner margins with an end opening slot 56 which is adapted to laterally receive therein the bail 31 of a complementary coupler. This bail is releasably retained within the slot by means of a hook-shaped latching member 57.

As shown in Figure 4, it will be noted that this coupler carries a latching member 35 of the same construction as embodied in coupler A and adapted to operate in the same manner for latching the coupler in extended operative position. The latch of coupler B is connected through a link 58 to the end of rocker arm 41 which lies on the opposite side of shaft 42 from the end of the arm which is connected to link 40. The link 58 is likewise slidably connected with the arm 41 and provided with a head portion 59 which permits sliding movement of the link through the connection in one direction, but limits its movement in the opposite direction. It will be noted that the springs 46 also act on the link 58 to apply tensioning forces against the associated latching member to move it into latching position, when coupler B is moved to operative extended position.

A releasing lever 49 is also provided at this end of the truck for releasing the latch of coupler B, when it is desired to permit it to move to depending position as shown in dotted lines in Figure 4.

By arranging the couplers as described above, the latches of the respective couplers may be selectively actuated to collapse or lower the selected coupling. In other words, either or both of the couplers may be disposed in extended operative position or in depending collapsed position, as desired.

Trucks having couplings constructed in accordance with the present invention find particular application by railroads for shipping L. C. L. freight as the material may be placed on a truck and the truck with the material thereon stowed in a freight car with the ends of the trucks in abutting relation without the necessity of having to utilize greater floor space than the space actually necessary for the truck as limited by its framework. The truck may be transported to destination in the car and there, manually or by means of a tractor pushed or drawn to its point of distribution, unloaded and the truck returned to the railroad for reuse. This manner of handling freight results in a material reduction in the cost of transportation as compared with the usual method of handling.

Although we have described certain specific uses for the embodiment of the invention herein disclosed, it will be understood that its use may be extended to all fields wherein it is desired to use vehicles with couplings which may be collapsed to a position within the confines of the vehicle body.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

We claim as our invention:

1. In a vehicle coupling, a coupling structure pivotally mounted at one end of the vehicle for bodily vertical swinging movements to coupling and non-coupling positions, said structure in the coupling position projecting beyond the endmost portion of the vehicle and in the non-coupling position being rearwardly disposed of the said endmost portion, latching means operative in latched position to retain said structure in normal coupling position, and means for releasing said latch to enable swinging of the structure out of normal position to its non-coupling position.

2. In a vehicle coupler, a coupling structure pivotally mounted at one end of the vehicle for bodily swinging movement to an operative position projecting past the end of the vehicle and an inoperative dependent position rearwardly of the associated vehicle end, means responsive to movement of the structure to operative position for latching it against movement in a reverse direction, and manually actuated means for releasing said latch and enabling swinging of the structure to inoperative position.

3. In a vehicle coupler, a coupling member pivoted at one end of the vehicle for swinging movement through an angle of substantially 90 degrees to an operative position extending forwardly of the adjacent vehicle end and to a depending position rearwardly disposed of said end, and means for latching said member in operative position, said member, when released from its operative position, automatically swinging to its inoperative position.

4. In combination with a vehicle having an end frame member, a coupling member, means pivotally mounting the coupling member for swinging movement to a position projecting forwardly of the foremost extremity of the frame member and a depending position rearwardly disposed of said extremity, a latch member pivoted at one end to the coupling member, spring means connected to said latch member for moving it into latching engagement with an abutment, when the coupling is moved to extended position, and a latch releasing member extending to one side of said coupling member.

5. In combination with a vehicle having an end frame member, a coupling member, means pivotally mounting the coupling member for swinging movement to a position projecting forwardly of the foremost extremity of the frame member and a depending position rearwardly disposed of said extremity, a latch member pivoted at one end to the coupling member, spring means connected to said latch member for moving it into latching engagement with an abutment, when the coupling is moved to extended position, and a latch releasing member extending to one side of said coupling member, said coupling member when released gravitating to depending position.

6. In a coupling device for a vehicle, a drawbar pivoted at one end for vertical swinging movement, a bumper head at the free end of the bar having a pair of divergent guide wings, a bail pivoted adjacent the bumper head for swinging movement relative to the wings, said bail extending around the outermost ends of said wings, means for resiliently maintaining said bail at a predetermined normal position in relation to said wings, and means normally latching the drawbar in extended position projecting past the end of the vehicle, said latter means, when released, enabling swinging movement of the drawbar and bail as a unit to a depending position.

7. In a coupling device for a vehicle, a drawbar pivoted at one end for vertical swinging movement, said bar having an end opening slot at its free end adapted to receive a part of a mating coupling member, a latch member normally closing the entrance to said slot, and means for releasably maintaining the drawbar in raised position extending past the vehicle end, said latter means, when released, enabling swinging movement of the drawbar and latch member to a non-projecting depending position rearwardly of the vehicle end.

8. In combination with a vehicle, a pair of coupling members respectively disposed at the ends of said vehicle, means mounting each of said members for swinging movement to a position projecting beyond the associated end of the vehicle and to the rear of said associated end, latches for respectively latching said members in projecting positions, means common to said latches for moving them to latching positions, and means for selectively releasing said latches 9. In combination with a vehicle, a pair of coupling members respectively pivoted at the opposite ends of said vehicle for vertical swinging movements, a latch associated with each of said members for normally retaining the members in raised extended relation to said vehicle, a spring, means connecting said spring with the latch for each member, said spring acting to retain the latches in latched positions, and a manually operable latch releasing member associated with each of said latches for selectively releasing each of the coupling members for swinging movement to a depending position.

10. A vehicle coupler comprising a drawbar connector pivoted at one end of the vehicle for swinging movements to coupling and non-coupling positions, the drawbar in the former position projecting beyond the vehicle end and in the latter position being disposed rearwardly of the vehicle end, an abutment on the vehicle, a latch member biased for movement to a position between the bar and said abutment when the drawbar is moved to coupling position, and means for moving the latch member from its position between the drawbar and abutment for enabling movement of the drawbar to non-coupling position.

11. A vehicle coupler comprising a swingable drawbar at one end of a vehicle movable to coupling and non-coupling positions, an elongate member pivoted at one end to the drawbar for movement therewith, an abutment on said vehicle, spring means acting, when the drawbar is swung to a coupling position, for swinging the member in one direction about its pivot to engage its outermost end with said abutment, and means for moving said member in the opposite direction to disengage the abutment and enable movement of the drawbar to non-coupling position.

12. A vehicle coupler comprising a swingably mounted drawbar at one end of a vehicle movable to coupling and non-coupling positions, an abutment on said vehicle, an articulated connection with the drawbar movable into engagement with said abutment in response to the movement of the drawbar to coupling position, whereby movement of the drawbar to non-coupling position is opposed, and means for moving said connection to disengage it from the abutment and enable movement of the drawbar to non-coupling position.

13. A vehicle coupler comprising a drawbar pivoted at one end to an end of the vehicle for swinging movement to extended and depending positions, a latch member pivoted at one end of the drawbar at a point spaced from the drawbar pivot, an abutment on the vehicle adjacent the drawbar pivot, and means including a spring for retaining the latch in substantially right-angled relation to the longitudinal axis of the drawbar and out of engagement with the abutment when the drawbar is in depending position, but said means acting to move the latch into substantially parallel relation with the longitudinal axis of the drawbar and into engagement with the abutment when the drawbar is in extended position.

14. In combination with a vehicle, a pair of couplers respectively pivoted at the opposite ends of the vehicle for swinging movements to coupling and non-coupling positions, a rocker arm having normally biased rocking movement in one direction, articulated connections respectively between the ends of the rocker arm and the couplers, and abutments adjacent each of said articulated connections, movement of the couplers to coupling positions actuating said connections into engagement with said abutments and opposing biased movement of said arm.

15. In combination with a vehicle, a pair of couplers respectively pivoted at the opposite ends of the vehicle for swinging movements to coupling and non-coupling positions, a rocker arm having normally biased rocking movement in one direction, articulated connections respectively between the ends of the rocker arm and the couplers, abutments adjacent each of said articulated connections, movement of the couplers to coupling positions actuating said connections into engagement with said abutments and opposing biased movement of said arm, and means for selectively disengaging said connections relative to said abutments.

LAWRENCE J. KLINE.
JOHN J. SICHMAN.